United States Patent [19]

Browning

[11] Patent Number: 4,475,408

[45] Date of Patent: Oct. 9, 1984

[54] TORQUE MEASURING DEVICE

[75] Inventor: Douglas Browning, Sykesville, Md.

[73] Assignee: Baltimore Therapeutic Equipment Company, Baltimore, Md.

[21] Appl. No.: 393,242

[22] Filed: Jun. 29, 1982

[51] Int. Cl.³ .............................................. G01L 3/16
[52] U.S. Cl. ................................... 73/862.12; 73/379
[58] Field of Search ................ 73/862.12, 862.13, 379, 73/862.08; 272/131, 132, 129; 188/161

[56] References Cited

U.S. PATENT DOCUMENTS

| | | | |
|---|---|---|---|
| 854,996 | 5/1907 | Garland | 73/862.17 |
| 1,991,826 | 2/1935 | Taylor | 73/862.09 |
| 2,395,905 | 3/1946 | Oetzel | 188/161 |
| 2,493,012 | 1/1950 | Moore et al. | 73/862.09 |
| 3,338,349 | 8/1967 | Klinkenberg et al. | 188/161 |
| 3,453,874 | 7/1969 | Cline | 73/862.13 |
| 3,734,256 | 5/1973 | Compton et al. | 188/161 X |
| 3,855,852 | 12/1974 | Cline | 73/862.13 |
| 3,856,297 | 12/1974 | Schnell | 272/129 |
| 4,235,439 | 11/1980 | De Donno | 73/379 X |
| 4,337,050 | 6/1982 | Engalitcheff, Jr. | 272/132 X |

Primary Examiner—Charles A. Ruehl
Assistant Examiner—Brian R. Tumm
Attorney, Agent, or Firm—James J. Brown

[57] ABSTRACT

A torque measuring device is described which provides for measurement of the rotative force applied against a shaft by engaging the shaft and an electric friction brake attached to a load cell for registering the force, and a reduced friction device for allowing the brake mounting plate to return to a neutral or zero position when force has been removed from the shaft. An externally selective voltage control actuates the friction brake.

3 Claims, 1 Drawing Figure

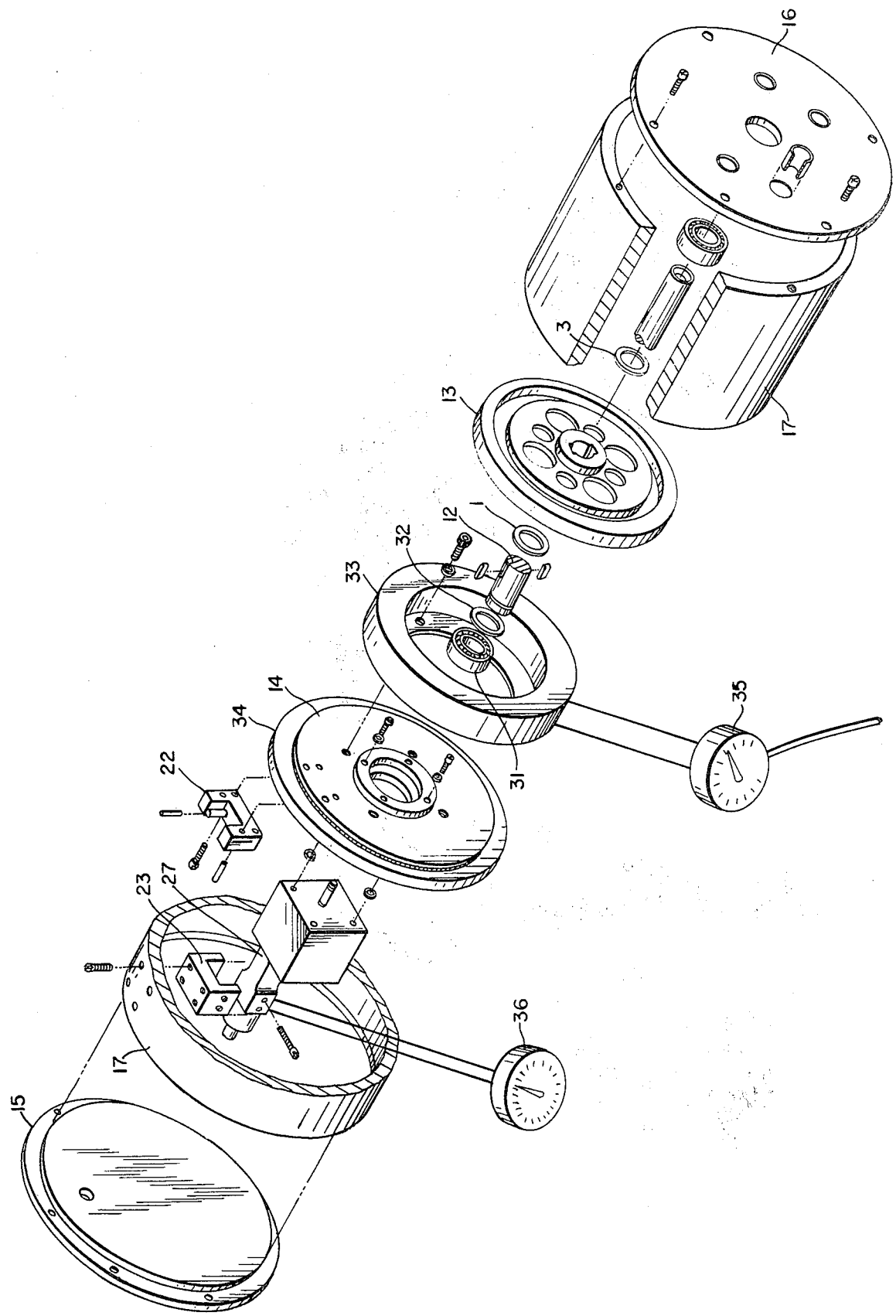

TORQUE MEASURING DEVICE

DESCRIPTION OF THE INVENTION

1. Technical Field of the Invention

The present invention relates to a torque measuring device for providing an electrical output proportional to torque applied to a shaft thus measuring the rotational force applied to the shaft. The device of the present invention as currently embodied permits measurement of rotational forces applied to a shaft in both shaft stationary and shaft rotating conditions. In one mode of operation the device of the invention can be "locked" so that the amount of work effort expended in turning the rotatable shaft is directly measured.

2. Background Art

Copending, commonly assigned U.S. patent application Ser. No. 06/099,838 filed Dec. 3, 1979 by John Engalitcheff, Jr. and now U.S. Pat. No. 4,337,050, the contents of which are incorporated by reference herein, describes a Method and Apparatus for the Rehabilitation of Damaged Limbs in which a plurality of interchangeable tool simulator accessories are detachably connected to a brake means having a constant, predetermined torque resistance for use in diagnostic and rehabilitation therapy of damaged upper extremities. By simulating the natural movements of common activities under conditions of controlled torque resistance which remains linear rather than increasing with increased load, this device permits a gradual series of progressive exercises which can avoid muscle damage caused by trying to progress too quickly.

The electrical brake employed therein has the inherent characteristic that torque is constant for a given voltage setting under therapeutically encountered conditions, unlike most prior art devices in which the torque resistance varies with speed. The device employed torque curves, as measured by a torque wrench, which were related to various voltage settings which produced given torque resistance levels. However, recalibration is required due to mechanical wear of the magnet and armature, and the need to resort to torque curves is inconvenient.

DISCLOSURE OF THE INVENTION

Accordingly, it is a general object of the present invention to provide a measuring device specially adapted for use in the field of rehabilitation and which will accurately and directly measure the force exerted by the patient.

It is another object of the present invention to provide a measuring device which readily causes the brake mounting plate to return to a neutral positon when force has been removed from the shaft.

Upon study of the specification and appended claims, further objects, features and advantages of the present invention will become more fully apparent to those skilled in the art to which this invention pertains.

BRIEF DESCRIPTION OF THE DRAWING

The single FIGURE is an exploded cross-sectional view of the work simulator embodying the device of the present invention illustrating the various component parts thereof.

BEST MODE FOR CARRYING OUT THE INVENTION

Briefly, the above and other objects, features and advantages of the present invention are attained in one aspect thereof by providing a measuring device which permits the measurement of the rotational force applied to the shaft. In accordance with the present invention, a rotatable magnetizable disc is mounted on the rotatable shaft adjacent an electric friction brake which is adapted to engage and restrain rotation of the disc and the shaft when an electric current is applied to the brake to produce a magnetic force. The brake is disposed so as to allow the shaft to rotate freely in the absence of an electric current.

The brake and its associated mounting plate are mounted perpendicular to and concentric with the axis of the rotatable shaft and mounted in a manner which allows them to rotate freely as a unit about the shaft axis.

A strain gauge is mounted such that one end is stationary and immoveable, the other end is mounted off axis to the brake mounting plate such that the gauge prevents rotation of the brake mounting plate. Thus when a rotational force is applied to the brake mounting plate the plate is restrained from moving by transmitting the force to the strain gauge thus stressing the gauge and causing an electrical signal to be present at the output of the strain gauge proportional to the stress inflicted on the gauge which is in turn proportional to the rotational force.

Referring to the drawing 17 is a cylindrical tube of sufficient inside diameter to house the entire assembly. This tube is itself held stationary by means described in pending U.S. patent application Ser. No. 06/099,838 now U.S. Pat. No. 4,337,050 incorporated by reference herein.

To the tube as illustrated is securely attached 23 the strain gauge mounting block and to it is mounted 27 the gauge itself thus keeping one end of the gauge stationary. Further, the gauge is positioned parallel with the axis of the tube between the I.D. of the tube and the axis of the tube. Within the tube is mounted 34 a bearing with sufficient O.D. so as to be held in position by the I.D. of the tube. The bearing is mounted with its axis of rotation parallel with that of the tube and both the bearing axis and the tube axis coincident. Within bearing 34 is mounted 14 the brake mounting plate. The action of this assembly is such that the plate is held with its axis coincident with that of the tube and is free via the bearing 34 to rotate about this axis within the tube.

On one side of the brake mounting plate is attached 22 the strain gauge actuator mounted off axis precisely the same distance as the gauge and designed so as to entrap the unmounted end of the gauge, the action of this assembly is to prevent the aforementioned rotation of the brake mounted plate while any force tending to rotate the BMP will tend to deflect the gauge thus setting up stress within the gauge and causing an electrical output which registers on meter 36. To the plate is mounted 33 the electric friction brake. This brake is mounted in a plane parallel with that of the plate with its axis coincident with the axis of the plate.

Central to 14, the brake mounting plate, is mounted a bearing 31. The O.D. of the bearing is retained within a counter bore in the plate thus retaining the bearing in the plane of the brake mounting plate with coincident axis.

A shaft 12 is modified by, from left to right, a snap ring groove, two keyways 180 degrees apart about the shaft, a second snap ring groove, and a third snap ring groove. To the shaft are assembled a snap ring 32 and two square keys. The Armature 13 is a ferrous disc one face of which is smooth with an O.D. matching that of the brake magnet and a central hole with two keyways sized such that the armature will slide freely along the shaft without excessive play while the two keyways engage the keys on the shaft thus allowing axial movement of the armature along the shaft while preventing relative rotation between the two. A second snap ring on the shaft prevents the armature from moving axially along the shaft so far as to allow the keyways to become disengaged from the shaft keys. A third snap ring is placed on the shaft completing the shaft assembly.

A front cover 16 is provided with an O.D. of sufficient size to pilot within the I.D. of the tube. Standard fasteners connect the cover to the tube and hold it in a plane parallel to that of the brake mounting plate. Central to the plate cover is provided a bearing counter bore (not shown) in the same manner as the brake mounting plate. Thus the bearing mounted in the brake mounting plate and the bearing mounted in the cover are maintained parallel and on the same axis of rotation.

The shaft assembly is mounted such that one end of the shaft is inserted in the central bearing of the brake mounting plate and the other end inserted in the bearing central to the front cover. The snap rings 1 and 3 occurring inside of their respective bearings prevent axial movement of the shaft. This positions the armature in close proximity to the brake magnet with its smooth face parallel to that of the magnet and its axis of rotation coincident with that of the brake mounting plate.

It can be seen that when a turning force is exerted on the shaft the shaft and the armature are free to rotate within the assembly. An electric current is passed from voltage control 35 through the brake magnet and a magnetic force is produced as its face proportional to the magnitude of current flow. This magnetic force attracts the armature which is allowed to move axially along the shaft until the face of the armature contacts the face of the brake magnet. The face of the brake magnet is friction material. It can be seen that while current is flowing in the brake the armature is attracted into intimate contact with the friction material and is retarded from rotating. The amount of retardation is a function firstly of the coefficient of friction between the friction material and the armature material, secondly of the force normal, and thirdly of the radius of gyration. The force normal being variable owing to its relationship to the magnitude of current flow.

Relative motion between the magnet and the armature is possible while current is flowing only if sufficient rotational force is applied to the shaft to overcome the retarding effect of the brake magnet. In order for motion to continue, the rotational force must be maintained on the shaft. In this system, the only thing preventing the brake assembly from rotation while current is flowing is the strain gauge. In this manner, any rotational force applied to the shaft while current is flowing is felt by the strain gauge and an output from the gauge is seen which is directly proportional to the force exerted on the shaft.

Without further elaboration it is believed that one skilled in the art can using the preceding description utilize the present invention to its fullest extent. The preferred embodiment is set forth herein is therefore to be construed as illustrative and not limitative of the invention in any way whatsoever.

What is claimed is:

1. A torque measuring device for measuring the rotational force applied to a shaft comprising a rotatable disc mounted on said shaft adjacent electric friction brake means adapted to engage and restrain rotation of said disc and shaft when an electric current is applied from externally selective means for varying voltage applied to said brake means to magnetize it, said shaft being disposed so as to otherwise rotate freely within said brake means and said brake means being attached to load cell means for measuring and registering the rotational force applied thereto in response to rotational force applied to said shaft.

2. The device of claim 1 which includes means for receiving plurality of attachments on said shaft for causing said rotation and simulating differing work modes.

3. The device of claim 1 wherein said brake means includes a second disc mounted rotatably on said shaft.

* * * * *